UNITED STATES PATENT OFFICE.

JAMES HENDERSON, OF NEW YORK, N. Y., ASSIGNOR OF ONE-HALF TO CHARLES G. FRANCKLYN, OF SAME PLACE.

ART OF MANUFACTURING IRON AND STEEL.

SPECIFICATION forming part of Letters Patent No. 280,310, dated June 26, 1883.

Application filed December 17, 1881. (No specimens.) Patented in England April 13, 1874, No. 1,267.

*To all whom it may concern:*

Be it known that I, JAMES HENDERSON, of the city, county, and State of New York, have invented a new and useful Improvement in the Art of Manufacturing Iron and Steel; and the following is a full, clear, and exact description of the same.

The object of this invention is the removal of the impurities from mixed metal—that is, wrought or scrap iron or steel mixed with cast-iron—containing an excess of phosphorus, and the production of cast-steel or homogeneous malleable iron therefrom. To this end the phosphoric mixed metal in a molten condition is subjected to the action of basic reagents while removed or free from contact with silicious substances, as linings to the containing-vessel, for the purpose of removing the phosphorus and other deleterious substances from it, and a compound containing manganese may be added to give steely qualities, as hereinafter more specifically described. By "phosphoric mixed metal" is meant a mixture of wrought and cast iron which contains too much phosphorus to make useful steel when treated by any of the processes heretofore known.

In practicing the invention old or scrap wrought-iron may be melted in a Bessemer high-pressure cupola, or in a Siemens regenerative steel-melting furnace or cupola, or in any other suitable furnace, with the addition of cast-iron, and either the wrought-iron or cast must be phosphoric, or both may be; and the melted mixed metal is then run into a reverberatory steel-melting furnace and subjected therein to the action of basic reagents, without contact with silicious or carbonaceous substance as linings, for the purpose of purifying the metal. When the wrought-iron is melted as above described with the addition of cast-iron, it makes a mixed metal which is a compound of iron, carbon, and phosphorus, which is converted into cast-steel or homogeneous malleable iron when subjected to the action of the basic reagents, as hereinafter described. The basic reagents which I have used with success are fluor-spar and the sesqui or per oxide of iron, or titaniferous iron ore, and the relative proportions in which I have used these materials are as follows, viz: forty parts, by weight, of fluor-spar to one hundred parts, by weight, of iron ore, the object being to provide a basic reagent to absorb the phosphorus from the mixed metal. The proportionate quantity of the basic reagent which I have used with success for each ton of mixed metal depends upon the quantities of carbon and phosphorus in the melted metal subjected to its action. If, for example, the mixed metal contains one per cent. of carbon and one per cent. of phosphorus, the amount of basic reagents may be three hundred-weight for each ton of melted mixed metal subject to the action of said reagents, and this quantity may be diminished or increased *pro rata*, as the percentage of carbon, or of phosphorus, or of silicon, or of any or all present in the mixed metal is less or greater than as above mentioned.

The preferred mode of practicing the invention is as follows: The basic reagents above described—preferably fluor-spar and titaniferous iron ore—are reduced to powder and thoroughly mixed, and the mixture is applied to the sides and bottom of the hearth of the reverberatory or other suitable steel-converting furnace, and is rendered viscid by heat; or I may use pulverized charcoal and oxide of manganese, or carbonate of manganese, and wolfram, or chrome iron ore and charcoal, and place any of these mixtures on the silicious lining of the hearth, and cover the same with sheet-iron, and then place the basic reagents upon this sheet-iron covering.

The kind of furnace which I prefer to employ for treating the mixed metal with the basic reagents is a reverberatory gas-furnace constructed with a revolving movable hearth, as described in Letters Patent No. 267,525, granted to me November 14, 1882, the fuel used in said furnace being preferably the gases evolved by the combustion of bituminous coal, which is burned by means of jets of heated air.

The cast and wrought iron to be mixed and purified is preferably melted in a furnace separate from the one above described preferably as follows: A quantity of gray foundry pig-iron equal to about one-third of the whole charge to be treated is melted in any suitable furnace, and wrought or scrap iron in quantity about equal to one-half of the whole charge is heated to a white heat and is introduced into the melted pig-iron. To insure the liquidity of the melted metal it is preferred to add to the melted metal liquid gray pig-iron (melted in a separate furnace) in the proportion, by weight, of about sixteen per cent. of the entire charge. The melted mixed metal is then tapped off from the melting-furnace, and is run into the steel-converting furnace previously prepared with the basic reagents hereinbefore described, and is therein subjected to the action of heat additional to the iron for a sufficient time to remove the phosphorus and more or less of the carbon, according to the desired condition of the mixed metal after its treatment, which may be from ten to thirty minutes. The purified melted mixed metal is then tapped and run into ingots. The action of the additional heat maintaining the metal in a liquid condition during the action of the reagents renders it sufficiently liquid to make good ingots.

It is generally preferred in producing cast-steel or homogeneous malleable iron by the mode above described to employ a sufficient quantity of the basic reagents to insure the removal of all the carbon and afterward to carbonize the purified product with spiegeleisen, ferro-manganese, or a compound of iron, carbon, and manganese added to the metal in the treating-furnace.

The hearth of the furnace in which the melted iron is subjected to the action of the basic reagents simultaneously with the application of additional heat may be of cast-iron, with a lining of refractory material, such as sand, fire-clay, ganister, or a mixture of these; or the material for making steel-melting crucibles may be employed, and if the lining material be silicious or carbonaceous, it should be covered with sheet-iron before the reagents are charged upon it; or the furnace-hearth may be lined, as described in my English Patent No. 1,051 of 1870, with lime or limestone, or with magnesia, or with magnesian lime or limestone, magnesian lime being preferred for that purpose. Care must at all times be used to prevent the charge from coming in contact with silicious or carbonaceous linings during the time that the basic reagents are acting to purify the metal, to obviate the forming of an acid slag from the silicious lining, which would prevent the proper and successful action of the basic reagents in the removal of the phosphorus, or to prevent the metal from becoming carbonized by contact with the carbonaceous lining.

I am aware that the purer qualities of cast or wrought iron, which are free or sufficiently free from phosphorus for practical purposes, have been melted together, and the silicon, manganese, and carbon removed by the use of oxide of iron or scrap-iron; but such process has been heretofore carried on in a silicious-lined vessel or hearth, in which the metal comes in contact with the silicious lining during the process of purification, which would be impracticable when metal containing a deleterious proportion of phosphorus was used in that process.

I do not claim herein the mixing of wrought-iron and cast-iron together, nor the refining of the purer qualities of cast-iron alone by the use of manganiferous or iron ore and adding thereto wrought-iron, nor the refining of the purer qualities of cast-iron and wrought-iron by the use of oxide of iron when melted together in contact with a silicious lining to the containing-vessel.

What I claim as new, and desire to secure by Letters Patent, is—

1. The process of manufacturing steel or homogeneous malleable iron from phosphoric mixed metal, consisting of the melting of wrought-iron and cast-iron, either of which is phosphoric, and mixing the two metals together, and maintaining this compound of iron, carbon, and phosphorus in a molten condition by additional heat in a furnace with basic reagents, free from contact with silicious substances, as a lining to the containing-vessel, to remove carbon and phosphorus, and finally adding a compound of iron, carbon, and manganese to give steely qualities to the metal, substantially as specified.

2. The process of manufacturing steel or homogeneous malleable iron from phosphoric mixed metal, consisting of the melting of wrought-iron and cast-iron, either of which is phosphoric, and mixing the two metals together, and maintaining this compound of iron, carbon, and phosphorus in a molten condition by additional heat in a furnace with a fluoride and an oxide, free from contact with silicious substances, as a lining to the containing-vessel, to remove carbon and phosphorus, and finally adding a compound of iron, carbon, and manganese to give steely qualities to the metal, substantially as specified.

3. The process of manufacturing steel or homogeneous malleable iron from phosphoric mixed metal, consisting of the melting of wrought-iron and cast-iron, either of which is phosphoric, and mixing the two metals together, and maintaining this compound of iron, carbon, and phosphorus in a molten condition by additional heat in a furnace with basic reagents, free from contact with silicious substances, as a lining to the containing-vessel, to remove the carbon and phosphorus, substantially as specified.

4. The process of manufacturing steel or homogeneous malleable iron, consisting of the melting of wrought-iron and cast-iron, either of which is phosphoric, and mixing the two metals together, and maintaining this compound of iron, carbon, and phosphorus in a molten condition by additional heat in a furnace with a fluoride and an oxide, free from contact with silicious substances, as a lining to the containing-vessel, to remove the carbon and phosphorus, substantially as specified.

5. The process of manufacturing steel or homogeneous malleable iron, consisting of the melting of wrought-iron and cast-iron, either of which is phosphoric, and mixing the two metals together, and maintaining this compound of iron, carbon, and phosphorus in a molten condition by additional heat in a calcareous-lined furnace with basic reagents.

6. The process of manufacturing steel or homogeneous malleable iron from phosphoric iron, consisting of the melting of wrought-iron and cast-iron, either of which is phosphoric, and mixing the two metals together, and maintaining this compound of iron, carbon, and phosphorus in a molten condition by additional heat in a calcareous-lined furnace with a calcareous reagent and oxide of iron.

In witness whereof I have hereto set my hand this 10th day of December, A. D. 1881.

JAMES HENDERSON.

Witnesses:
EDW. R. BREVOORT,
W. L. BENNEM.